United States Patent [19]

Verhoeven et al.

[11] Patent Number: 4,507,681

[45] Date of Patent: Mar. 26, 1985

[54] METHOD OF AND DEVICE FOR X-RAY PROCESSING

[75] Inventors: Leonardus A. J. Verhoeven; Otto E. Scheltema; Walter E. Carels, all of Eindhoven, Netherlands

[73] Assignee: U.S. Philips Corporation, New York, N.Y.

[21] Appl. No.: 438,832

[22] Filed: Nov. 3, 1982

[30] Foreign Application Priority Data

Jun. 17, 1982 [NL] Netherlands ............................ 8202450

[51] Int. Cl.³ ............................................... H04N 7/18
[52] U.S. Cl. ...................................... 358/111; 358/138; 358/166; 364/724; 378/99
[58] Field of Search .............. 358/111, 135, 138, 166, 358/160; 364/724, 414; 378/99, 100; 128/653, 659

[56] References Cited

U.S. PATENT DOCUMENTS 4,149,259 4/1979 Kowalski .......................... 364/724
4,350,998 9/1982 Verhoeven ........................ 358/111
4,394,684 7/1983 Verhoeven ........................ 358/111

Primary Examiner—Howard W. Britton
Attorney, Agent, or Firm—Paul R. Miller

[57] ABSTRACT

The method and the device in accordance with the present invention utilizes a recursive filter for forming a composite image from a short series of X-ray images with the weighting factor α used in the filter being a function of the number of X-ray images processed and to be processed. When α is suitably chosen, the amplitude of the composite image is always constant, such as a constant image brightness, and each X-ray image makes an equally large contribution to the composite image. The noise level in the composite image decreases as the number of processed X-ray images is larger.

17 Claims, 6 Drawing Figures

METHOD OF AND DEVICE FOR X-RAY PROCESSING

The invention relates to a method of processing a short series of X-ray images in order to form a composite image with the short series of X-ray images being made from an object at least once and the composite image to be displayed being determined from the short series of X-ray images.

The invention also relates to a device for the processing of a short series of X-ray images, comprising an X-ray image forming device for producing at least one short series of X-ray images which are divided into pixels, and also comprising a memory for the storage of image information per pixel.

Such a method and device are known from a publication in "Optical Engineering", Vol. 17, No. 6, November/December 1978, pages 652–7; therein it is proposed to combine (sum) a short series of X-ray images for storage in a memory. Such a method improves the signal-to-noise ratio of the composite image stored in the memory. The amplitudes of the composite image will step-wise increase per X-ray image during the building up of the composite image from the short series of X-ray images and, when the (step-wise varying) composite image is displayed on a television screen, a flickering image will result. Consequently, the method and the device described in the publication are not suitable for electronic radiography where a X-ray image is directly displayed via an image intensifier and television chain. Evidently, the flickering of the X-ray image displayed on the television monitor, is disturbing.

The device described in this publication utilizes three memories with associated further circuits for determining subtraction images from successive X-ray images with the subtraction image being determined by (weighting and) subtraction of the content of two memories. The third memory is filled with newly generated X-ray images. Evidently, such a device is comparatively expensive but produces a subtraction image whose amplitude is constant in time.

It is an object of the invention to provide a method and a device which are suitable for electronic radiography and which produce a television image having a constant amplitude (without flicker) and in which noise is suppressed.

It is a further object of the invention to provide a method of and a device for determining subtraction images from short series of successive X-ray images which require only two memories and associated circuits, and which produce subtraction images being suitable for direct display via a television monitor and which have a constant amplitude (without flicker), while the noise is substantially suppressed therein.

A method in accordance with the invention is characterized in that the composite image is formed from at least one last X-ray image made which is multiplied by a weighting factor $\alpha$ being smaller than or equal to 1, and from a composite image which is determined from the previously made X-ray images and which is weighted with a complementary weighting factor $(1-\alpha)$ with the weighting factor $\alpha$ being dependent on the number of X-ray images of the series already processed and having an initial value 1 and a value smaller than 1 for each new composite image to be formed, each weighting factor being smaller than or equal to the preceding weighting factor. Using such a method, the amplitude of the composite image remains constant (when the weighting factors which can be simply calculated in advance are suitably chosen), regardless of the number of X-ray images used to form the composite image. The noise occuring in a composite image decreases as the number of X-ray images used to form the composite image increases.

A device in accordance with the invention is characterized in that in conjunction with at least one multiplier circuit and one adder circuit the memory forms a recursive filter for filtering in a time domain image information per pixel of successive images of the series with a composite image being formed from at least one last X-ray image made which is multiplied by the multiplier circuit by a weighting factor $\alpha$ smaller than or equal to 1, and from a composite image which is determined from the previously made X-ray images and which is weighted with a complementary weighting factor $(1-\alpha)$ with the weighting factor $\alpha$ of the multiplier circuit being dependent on the number of X-ray images already processed and having an initial value 1, the weighting factor having a value smaller than 1 for each new X-ray image of a series to be processed and being smaller than or equal to the preceding weighting factor.

A preferred embodiment of a method in accordance with the invention is characterized in that a subtraction image is formed from the short series of X-ray images by determination of the difference between a composite image formed from the X-ray images made thus far and a further image. As from the first composite image, such a method offers a subtraction image having a constant amplitude, regardless of the number of X-ray images used thus far for the formation of composite image, the noise level in the subtraction image decreasing as the number of X-ray images processed increases.

It is to be noted that Netherlands Patent Application No. 79.05.611 (corresponding to U.S. Pat. No. 4,394,684) discloses a device for the determination of a subtraction image from a last X-ray image formed and from a composite image formed from a weighted sum of preceding X-ray images and this device utilizes a recursive filter. However, at the beginning of each series of X-ray images (the beginning of the formation of a subtraction image) such a device produces a subtraction image whose amplitude (slowly) increases to an ultimate value after the processing of several X-ray images. The use of such device for the processing of short series (for example, 4, or 8) of X-ray images will result in subtraction images having an amplitude which increases in each X-ray image and which is reset to zero after completion of each series, so that flicker will occur when such subtraction images are displayed on the television monitor.

Embodiments in accordance with the invention will be described in detail hereinafter with reference to the drawing; therein:

Figure 1:
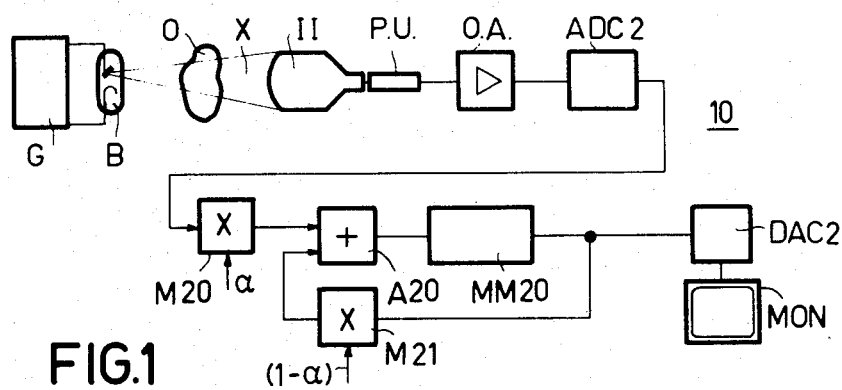
FIG. 1 shows a device in accordance with the invention.

The examination device 10 shown in FIG. 1 comprises a high-voltage source G for powering an X-ray tube B. The radiation X produced by the X-ray tube B irradiates an object O and a shadow image of the object O is formed on an entrance screen of an image intensifier II. The reduced and intensified shadow image is converted into an analog video signal via an image pick-up tube PU which is coupled to an exit screen of the image intensifier II. An amplifier comprising a sample circuit OA amplifies and samples the video signal, after which the sampled signal is digitized via an analog-to-digital converter ADC2.

The digitized signal is applied to an image information processing section which comprises the following elements; multipliers $M_{20}$ and $M_{21}$, an adder $A_{20}$ and a memory $MM_{20}$. The examination device shown in FIG. 1 also comprises a digital-to-analog converter DAC2 and a display device MON (for example, a television monitor). Evidently, the examination device may also comprise a magnetic tape recording device for video or digital signals or a copier/printer for more permanent recording of the processed X-ray images.

The image information processing section constitutes a recursive filter which produces a composite image. The filter operates as follows: a value of a pixel which originates from the analog-to-digital converter ADC2 is applied to the multiplier $M_{20}$ in which it is multiplied by the weighting factor $\alpha$ ($0 \leq \alpha \leq 1$) which is also applied to the multiplier $M_{20}$. In the device in accordance with the invention, the weighting factor $\alpha$ depends on the number of X-ray images processed as will be described in detail hereinafter. The product is applied to the adder $A_{20}$ which also receives the value already stored in the memory $MM_{20}$ for the same pixel, after multiplication of the latter value by a weighting factor $(1-\alpha)$. The multiplication is performed by the multiplier $M_{21}$ which connects the output of the memory $MM_{20}$ to an input of the adder $A_{20}$. The sum of the two values applied to the adder $A_{20}$ is stored at the address associated with the relevant pixel. The digital-to-analog converter DAC2 receives the value stored in the memory $MM_{20}$, so that the composite image is displayed on the monitor MON.

Figure 2:
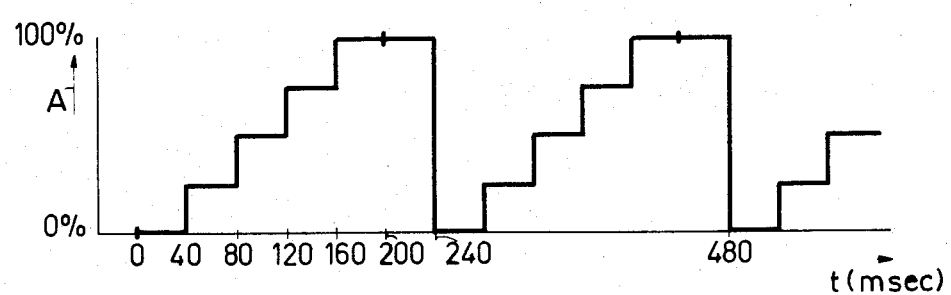
FIG. 2 shows the amplitude build-up, as a function of time, of a subtraction image using conventional summing.

If the value stored in the memory $MM_{20}$ were applied directly to the adder $A_{20}$ ($M_{21}$ "bridged" and inactive), the build-up of the composite image in the memory $MM_{20}$ would be as shown in FIG. 2, assuming that every 240 ms the X-ray source B produces an X-ray pulse having a duration of 160 ms and that four X-ray images (each having a duration of 40 ms) are produced during the X-ray pulse. The composite image is a linear sum of the four X-ray images and the amplitude A thereof increases from 0% to 100% in four steps (of 25% each). After each period of 240 ms a new composite image is formed, each time after the erasure of the memory $MM_{20}$. When the composite image is directly displayed on a television monitor (in electronic radiography), such an image will exhibit substantial flicker which is very annoying for a radiologist using the device.

Figure 3:
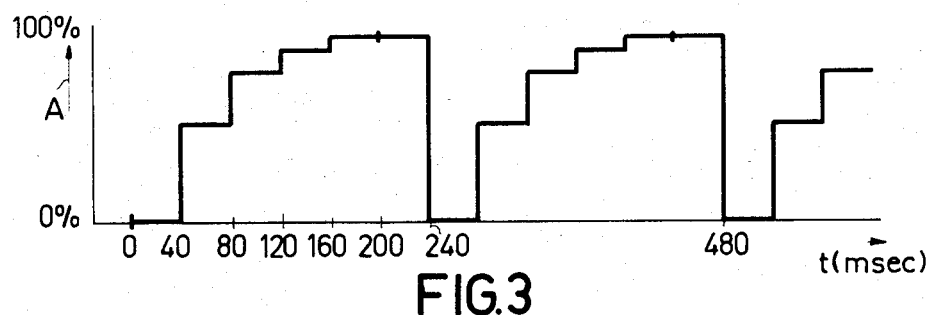
FIG. 3 shows an amplitude build-up, as a function of time, of a subtraction image using recursive summing.

If the weighting factor $\alpha$ is constant and the output signal of the memory $MM_{20}$ is returned to the adder $A_{20}$ via the multiplier $M_{21}$ (weighting factor $1-\alpha$), the amplitude A of an image composed of successive X-ray images will be built up as shown in FIG. 3. For this example (and also in the following examples) it is again assumed that every 240 ms the X-ray source G generates an X-ray pulse having a duration of 160 ms during which four X-ray images having a duration of 40 ms each are generated. Evidently, if simply a recursive filter is used in which the noise effect in the composite image decreases as the number of X-ray images processed increases, the composite image to be displayed will have a strongly varying amplitude A, thus causing a flickering image on the television monitor. The output signal of the memory $MM_{20}$ (=the amplitude of the composite image) can be expressed as follows:

$$Vu(n) = \alpha \cdot Vi(n) + \alpha \cdot (1-\alpha) \cdot Vi(n-1) + \alpha \cdot (1-\alpha)^2 \cdot$$

$$Vi(n-2) + \alpha(1-\alpha)^3 \cdot Vi(n-3)$$

in which $Vu(n)$ is the amplitude of the composite image after the processing of n X-ray images and $Vi(n)$ is the amplitude of the $n^{th}$ X-ray image. When the weighting factor $\alpha$ has a constant value, for example, $\frac{1}{2}$, the following is applicable:

$$Vu(n) = 8/16 Vi(n) + 4/16 Vi(n-1) + 2/16 Vi(n-2) + 1/16 Vi(n-3)$$

The contribution of the successive X-ray images to the composite image is not constant but decreases exponentially. The desired integration of noise is far from optimum, because the last X-ray image processed makes a much larger noise contribution than the preceding X-ray image which in its turn makes a much larger contribution than the preceding X-ray image, while the contributions of the previously processed X-ray images are substantially negligibly small. The X-ray dose used to generate the latter X-ray images, therefore, is highly inefficiently used.

The method and the device in accordance with the invention solve both described problems; the flickering of the composite image to be displayed is avoided and the contribution of each X-ray image to the noise integration is also substantially optimum. In accordance with the invention both objects are achieved by rendering the weighting factor $\alpha$ dependent on the number of X-ray images already processed and on the total number (four in the foregoing and following examples) of X-ray images to be processed in a short series which is periodically repeated.

The composite image in accordance with the invention has an amplitude:

$$Vu(4) = \alpha_4 \cdot Vi(4) + \alpha_3(1-\alpha_4) \cdot Vi(3) + \alpha_2(1-\alpha_3) \cdot (1-\alpha_4) \cdot Vi(2) + \alpha_1(1-\alpha_2) \cdot (1-\alpha_3) \cdot (1-\alpha_4) \cdot Vi(1).$$

Figure 4:
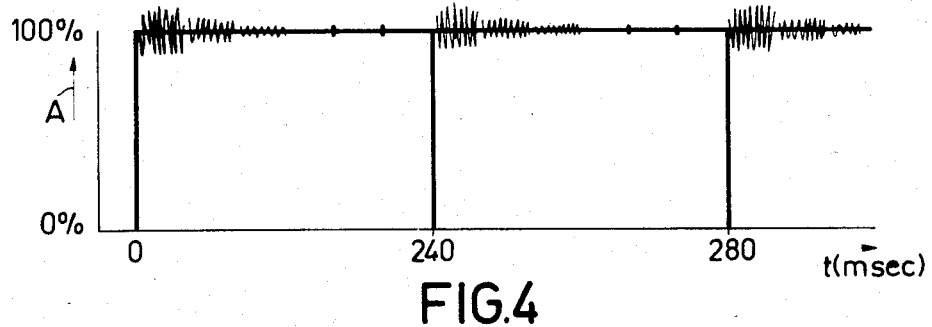
FIG. 4 shows an amplitude build-up, as a function of time, of a subtraction image in accordance with the invention.

When each X-ray image $Vi(n)$ ($1 \leq n \leq 4$) is to make an equally large contribution to the composite image $Vu(n)$, it follows that the weighting factors $\alpha_1$, $\alpha_2$, $\alpha_3$ and $\alpha_4$ must have the values 1, $\frac{1}{2}$, $\frac{1}{3}$ and $\frac{1}{4}$ respectively. When the weighting factors $\alpha_1$ to $\alpha_4$ are used, the amplitude A of the composite image $Vu$ will have a constant value as shown in FIG. 4. After the first X-ray image, the composite image will be identical thereto ($\alpha_1 = 1$, $(1-\alpha_1) = 0$), including the noise in the X-ray image which is diagrammatically shown in FIG. 4 (not to scale). After the processing of the second X-ray image, the amplitude A of the composite image is still the same, but the noise content is the mean value of the noise contents of the two processed X-ray images. After four processed X-ray images, the amplitude A of the composite image exactly equals the mean value of the amplitudes of the four X-ray images. Thus, each X-ray image makes the same amplitude contribution of the ultimate composite image which has a noise level which equals the mean noise level of the four X-ray images and which is retained until (after 240 ms) a new series of X-ray images is processed in order to form a new composite image having the successive weighting factors $\alpha_1$, $\alpha_2$, $\alpha_3$ and $\alpha_4$. The amplitudes A of the successive composite images from a series of X-ray images, therefore, always remain constant with the exception of the noise present therein which decreases in each of the successive composite images.

When the multipliers $M_{20}$ and $M_{21}$ of the device 10 shown in FIG. 1 are formed by digital multiplier circuits, the weighting factors $\alpha_1$, $\alpha_2$, $\alpha_3$ and $\alpha_4$ can be accurately adjusted and the filtering operation can be accurately performed.

Figure 5:
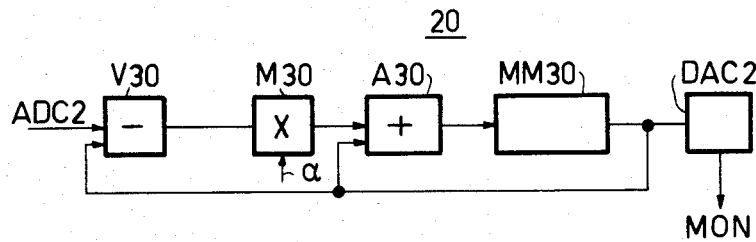
FIG. 5 shows a preferred embodiment of a part of the device in accordance with the invention.

However, it is simpler to use a recursive filter 20 as shown in FIG. 5. The recursive filter 20 used comprises only one multiplier circuit $M_{30}$, but also comprises an additional subtract circuit $V_{30}$, in addition to the adder circuit $A_{30}$ shown in FIG. 1, and a memory $MM_{30}$. Evidently, this recursive filter 20 performs exactly the same filtering operation as the filter of the device 10 shown in FIG. 1.

Because the filter 20 utilizes only one multiplier circuit $M_{30}$, a multiplication can be performed with weighting factors 1, ½, ¼ (or ⅛) simply by shifting the ones and zeros of the binary number presented to the multiplier $M_{30}$ on parallel lines through none, one and two (or three) positions, respectively, in the direction of the least significant bit. A preferred embodiment of the method and the device in accordance with the invention utilizes the weighting factors $\alpha_1$, $\alpha_2$, $\alpha_3$ and $\alpha_4$ having the values 1, ½, ¼ and ¼ respectively. After the processing of four X-ray images, the amplitude of the composite image is then:

$$Vu(4) = 8/32 \cdot Vi(4) + 6/32 \cdot Vi(3) + 9/32 \cdot Vi(2) + 9/32 \cdot Vi(1).$$

The contributions of the X-ray images of the short series are, therefore, substantially equal and the noise integration is substantially optimum.

By using powers of 2 as the values of the weighting factors $\alpha_i$, the multiplier circuit $M_{30}$ actually need comprise only multiplex circuits whereby the parallel input binary number is applied parallel to the output lines after shifting through none, one or two bit positions. The position of the multiplex circuit is then simply controlled, for example, by means of a counter which counts the number of X-ray images processed and which receives for this purpose control pulses derived from the vertical synchronization pulses (for the television pick-up tube).

Figure 6:
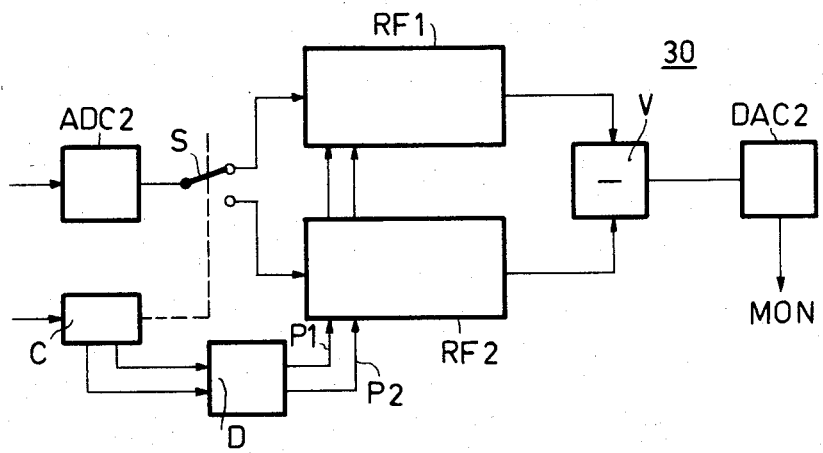
FIG. 6 shows a preferred embodiment of a device in accordance with the invention.

A preferred embodiment of a device 30 in accordance with the invention is shown in FIG. 6. The signal applied to the analog-to-digital converter ADC2 originates from an X-ray image intensifier/television chain as shown in FIG. 1 and is presented to one of the two recursive filters RF1 and RF2 via a switch S. The filters RF1 and RF2 are identical to the recursive filter 20 shown in FIG. 5.

Via the switch S, the first four X-ray images are applied to the filter RF1 which forms a new composite image therefrom after each newly presented X-ray image and stores this composite image in its memory. After the processing of the four X-ray images, the filter is switched over by a counter C which counts the number of processed X-ray images by way of the control pulses. During the next four successive X-ray images, each time a new composite image is formed by the filter RF2 and is stored in the memory of this filter. The composite images stored in the memories of the filters RF1 and RF2 are subtracted in order to form a subtraction image which is applied, via the digital-to-analog converter DAC2, to the monitor MON for display. The subtraction image may be the difference between the composite images of two directly successive short series (of four X-ray images for which the switch S is switched over each time after four X-ray images), but may also be formed from a first composite image, for example, stored in the memory of the filter RF1 (for example, for X-ray images without contrast medium in the object) and the subsequent composite images which are each time formed by the filter RF2 (from X-ray images with contrast medium) for which the switch S need be changed over only once from the position shown to the position which is not shown.

In order to ensure that the filters RF1 and RF2 generate the appropriate composite images, a decoder circuit D is connected to the counter C, said decoder circuit determining, on the basis of the counter position (the number of processed X-ray images), the multiplex circuit whose switches (T.T.L. circuits) have to be switched over. Only the switches of the filter RF1 or RF2 whereto new X-ray images are applied should be activated. The switches of the other filter RF2 or RF1 remain in the position associated with a weighting factor $\alpha = 1$ in view of the "refreshment" of the memory (dynamic RAM). Because the binary number is shifted through two positions during the multiplication by ¼, the multiplex circuit should be a three-to-one multiplex circuit which, however, can be formed by a cascade connection of two two-to-one multiplex circuits. The decoding circuit D shown in FIG. 6 controls the cascade-connected multiplexers of both filters RF1 and RF2. In the position 00 of the counter C, both outputs $P_1$ and $P_2$ of the decoder D are inactive. In the position 01 (after one X-ray image), the output $P_1$ is active and switches over the switches of a first (two-to-one) multiplexer (shift through one bit position). In the positions 10 and 11 of the counter C, both outputs $P_1$ and $P_2$ are active and both cascade-connected multiplexers are switched over (shift through two bit positions).

What is claimed is:

1. A method of processing a short series of X-ray images to form a composite image comprising the steps of making a short series of X-ray images of an object, and determining a composite image to be displayed from said short series of X-ray images, said composite image being formed from at least one last X-ray image, said last X-ray image being multiplied by a weighting factor $\alpha$ smaller than or equal to 1, and said composite image being formed from a previously formed composite image, said previously formed composite image being weighted with a complementary weighting factor $(1 - \alpha)$, wherein said weighting factor $\alpha$ is dependent on the number of X-ray images of said short series of X-ray images previously processed, said weighting factor $\alpha$ having an initial value of 1 and a value smaller than 1 for each new composite image formed, each of said weighting factors being smaller than or equal to a preceding weighting factor.

2. A method according to claim 1, wherein a subtraction image is formed from said series of X-ray images, said subtraction image being determined by the difference between a composite image made from thus far produced X-ray images and a further image.

3. A method according to claim 1, wherein said series of X-ray images is periodically made of said object.

4. A method according to claim 1, wherein said short series of images is no more than eight X-ray images.

5. A method according to claim 1, wherein said short series of X-ray images comprises four X-ray images, and wherein said weighting factor $\alpha$ successively has values of 1, ½, ¼ and ¼ for said composite images to be successively formed.

6. A method according to claim 5, wherein a subtraction image is formed from said series of X-ray images, said subtraction image being determined by the difference between a composite image made from thus far produced X-ray images and a further image.

7. A method according to claim 5, wherein said series of X-ray images is periodically made of said object.

8. A method according to claim 1, wherein said series of X-ray images comprises n X-ray images with n being a positive integer number larger than 1, and wherein an X-ray image i has a weighting factor $\alpha_i$ with said weighting factor $\alpha_i$ having a value 1/i where $1 \leq i \leq n$.

9. A method according to claim 8, wherein a subtraction image is formed from said series of X-ray images, said subtraction image being determined by the difference between a composite image made from thus far produced X-ray images and a further image.

10. A method according to claim 9, wherein said series of X-ray images is periodically made of said object.

11. A device for processing a short series of X-ray images comprising
X-ray image forming means for producing at least one short series of X-ray images, said X-ray images being divided into pixels, and
recursive filter means for filtering in time domain image information per pixel of successive images of said series,
said recursive filter means including memory means for storing image information per pixel, at least one multiplier circuit, and at least one adder circuit,
wherein a composite image is formed from at least a last X-ray image, said last X-ray image being multiplied by said multiplier circuit by a weighting factor $\alpha$ smaller than or equal to 1, and is formed from a previously formed composite image determined by previously made X-ray images, said previously formed composite image being weighted with a complementary weighting factor $(1-\alpha)$, and
wherein said weighting factor $\alpha$ of said multiplier circuit is dependent on the number of X-ray images previously processed, said weighting factor $\alpha$ having an initial value of 1, and said weighting factor $\alpha$ having a value smaller than 1 for each new X-ray image of a further series to be processed, each of said weighting factors being smaller than or equal to the preceding weighting factor.

12. A device according to claim 11, wherein a subtraction circuit is provided for subtracting image information of each pixel of said composite image from image information of a corresponding pixel for a further image, and wherein a display device for displaying a thus provided subtraction image is provided.

13. A device according to claim 11, wherein said short series of images is no more than eight X-ray images.

14. A device according to claim 11, wherein said multiplier circuit is a digital multiplier, wherein said series of images comprise n X-ray images, and wherein said weighting factor $\alpha$ has a value 1/i for processing the $i^{th}$ X-ray image.

15. A device according to claim 14, wherein a subtraction circuit is provided for subtracting image information of each pixel of said composite image from image information of a corresponding pixel for a further image, and wherein a display device for displaying a thus provided subtraction image is provided.

16. A device according to claim 11, wherein said short series of images comprises four X-ray images, said weighting factor being successively 1, ½, ¼ and ¼, and wherein said multiplier circuit comprises a multiplex circuit.

17. A device according to claim 16, wherein a subtraction circuit is provided for subtracting image information of each pixel of said composite image from image information of a corresponding pixel for a further image, and wherein a display device for displaying a thus provided subtraction image is provided.

* * * * *